United States Patent
Maschelski et al.

(10) Patent No.: US 10,493,517 B2
(45) Date of Patent: Dec. 3, 2019

(54) METHOD FOR PRODUCING A RING WITH A TOOTHING

(71) Applicants: THYSSENKRUPP ROTHE ERDE GMBH, Dortmund (DE); thyssenkrupp AG, Essen (DE)

(72) Inventors: Uwe Maschelski, Ahlen (DE); Jan Golz, Hattingen (DE)

(73) Assignees: THYSSENKRUPP ROTHE ERDE GMBH, Dortmund (DE); THYSSENKRUPP AG, Essen (DE)

( * ) Notice: Subject to any disclaimer, the term of this patent is extended or adjusted under 35 U.S.C. 154(b) by 165 days.

(21) Appl. No.: 15/742,998

(22) PCT Filed: Jul. 5, 2016

(86) PCT No.: PCT/EP2016/065836
§ 371 (c)(1),
(2) Date: Jan. 9, 2018

(87) PCT Pub. No.: WO2017/005740
PCT Pub. Date: Jan. 12, 2017

(65) Prior Publication Data
US 2018/0214930 A1    Aug. 2, 2018

(30) Foreign Application Priority Data

Jul. 9, 2015    (DE) .......................... 10 2015 111 137

(51) Int. Cl.
*B23P 15/14*    (2006.01)
*B21H 1/06*    (2006.01)
(Continued)

(52) U.S. Cl.
CPC ................ *B21H 1/06* (2013.01); *B23P 13/04* (2013.01); *B23P 15/14* (2013.01); *B21H 5/00* (2013.01); *F16H 2055/176* (2013.01)

(58) Field of Classification Search
CPC ................ B21H 1/06; Y10T 29/49462; Y10T 29/49467; Y10T 29/49469;
(Continued)

(56) References Cited

U.S. PATENT DOCUMENTS 4,856,166 A * 8/1989 Miwa ...................... B23P 15/14
29/893.2
5,310,432 A * 5/1994 Fukui ..................... B21D 53/28
148/330
(Continued)

FOREIGN PATENT DOCUMENTS

CN    1151917 A    6/1997
CN    103161915 A    6/2013
(Continued)

OTHER PUBLICATIONS

English Translation DE102010000767 (Year: 2011).*
English Translation of International Search Report issued in PCT/EP0216/065836, dated Sep. 27, 2016 (dated Oct. 6, 2016).

*Primary Examiner* — Jason L Vaughan
*Assistant Examiner* — Amanda Kreiling
(74) *Attorney, Agent, or Firm* — thyssenkrupp North America, Inc.

(57) ABSTRACT

A method for producing a ring with a toothing may involve (a) ring rolling a pre-ring to form a ring blank, (b) introducing a pre-toothing into the ring blank to form a pre-toothed ring, wherein the pre-toothing has teeth with a first tooth height, (c) heating, quenching, and tempering the pre-toothed ring to form a heat-treated pre-toothed ring, and (d) finish-toothing the heat-treated pre-toothed ring to form a ring with a toothing. The toothing may have teeth with a second tooth height that is greater than the first tooth height. Further, the introducing of the pre-toothing or the finish-
(Continued)

toothing of the heat-treated pre-toothed ring may be performed by way of a metal machining process.

20 Claims, 1 Drawing Sheet

(51) Int. Cl.
*B23P 13/04* (2006.01)
*B21H 5/00* (2006.01)
*F16H 55/17* (2006.01)

(58) Field of Classification Search
CPC ......... Y10T 29/49471; Y10T 29/49472; Y10T 29/49474; Y10T 29/49476; Y10T 29/49478
See application file for complete search history.

(56) References Cited

U.S. PATENT DOCUMENTS

| | | | | |
|---|---|---|---|---|
| 5,392,517 A | | 2/1995 | Lyon | |
| 5,824,168 A | * | 10/1998 | Miyamoto | ............... B21H 5/02 148/573 |
| 2008/0032851 A1 | * | 2/2008 | Mordukhovich | ...... B21H 5/022 475/344 |

FOREIGN PATENT DOCUMENTS

| | | | | |
|---|---|---|---|---|
| DE | 4436803 A | | 4/1996 | |
| DE | 102008005696 A | | 7/2008 | |
| DE | 102008010302 A | | 8/2009 | |
| DE | 102010000767 A | | 7/2011 | |
| DE | 102010000767 A1 | * | 7/2011 | ............... B21H 1/06 |
| DE | 102013100679 A | | 7/2014 | |
| JP | S61117014 A | | 6/1986 | |

* cited by examiner

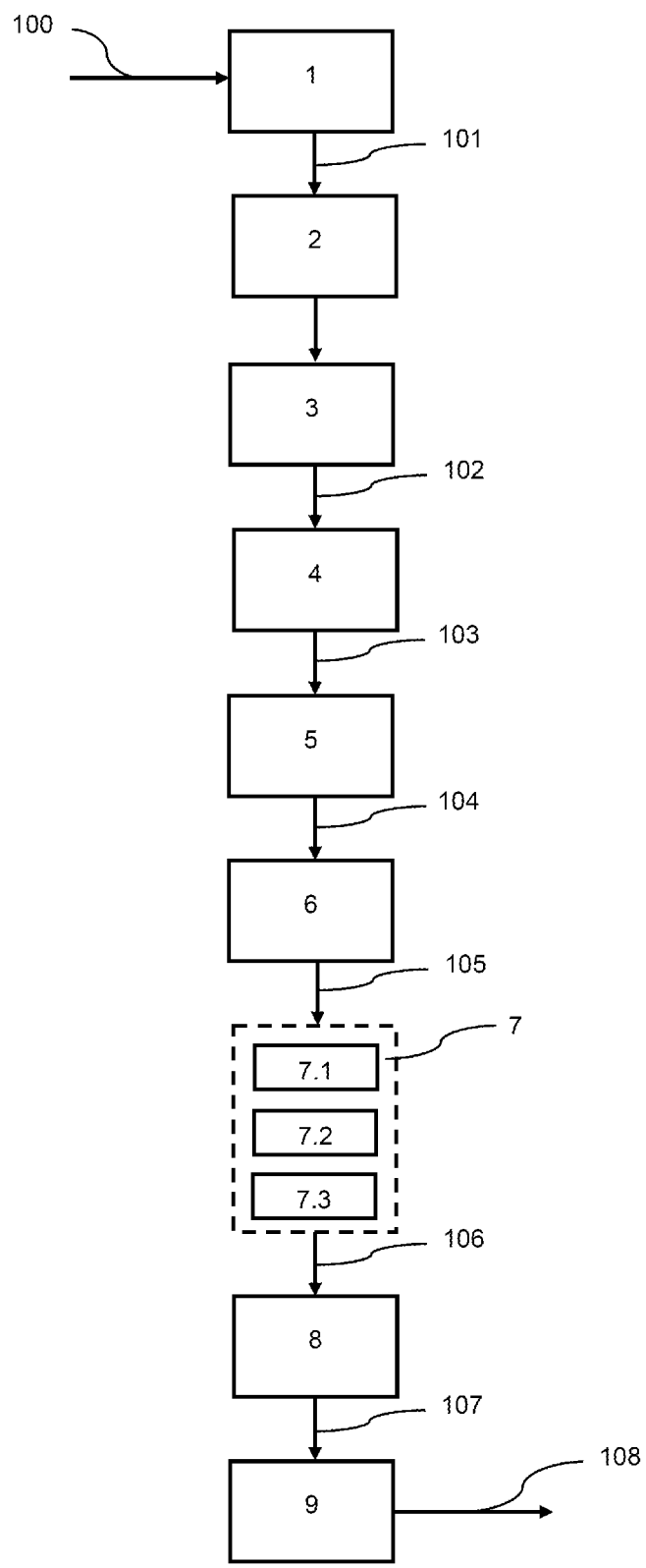

METHOD FOR PRODUCING A RING WITH A TOOTHING

CROSS REFERENCE TO RELATED APPLICATIONS

This application is a U.S. National Stage Entry of International Patent Application Serial Number PCT/EP2016/065836, filed Jul. 5, 2016, which claims priority to German Patent Application No. DE 10 2015 111 137.3, filed Jul. 9, 2015, the entire contents of both of which are incorporated herein by reference.

FIELD

The present disclosure generally relates toothed rings, including methods for manufacturing such toothed rings.

BACKGROUND

Rings with a toothing are used for example as components of large gearings and large roller bearings for cranes, tunneling machines, or wind power plants.

During the fabrication of such rings, usually a seamless rolled ring blank is at first formed by means of a ring rolling method. The ring blank is heat treated as a single piece, in order to improve the strength properties of the material. After the heat treatment by heating, quenching and tempering, the toothing is then generally introduced by means of a metal cutting process.

This method of production of rings with a toothing has worked quite well. However, it has been found that in the case of production of rings with a toothing having teeth with a significant tooth height may result in larger deviations of the mechanical properties in the region of the tooth base as compared to the tooth tip. In particular, the strength in the region of the tooth base may be significantly reduced.

Thus a need exists to increase the strength in the region of the tooth base.

BRIEF DESCRIPTION OF THE FIGURE

FIG. 1 is a flow chart depicting an example fabrication method.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a method for producing a ring with a toothing may comprise the following method steps:

(a) ring rolling of a pre-ring to form a ring blank, (b) introducing a pre-toothing into the ring blank to form a pre-toothed ring, wherein the pre-toothing has teeth with a first tooth height, (c) heating, quenching and tempering of the pre-toothed ring to form a heat-treated pre-toothed ring, and (d) finish-toothing of the heat-treated pre-toothed ring to form a ring with a toothing which has teeth with a second tooth height which is greater than the first tooth height.

According to the invention, prior to the heating, quenching and tempering a pre-toothing is introduced into the ring blank, having a reduced first tooth height as compared to a nominal tooth height of the ring being fabricated. In this way, the region forming the tooth base in the finished ring lies at less distance from the surface than would be the case without a pre-toothing. The reduced distance from the surface produces a heightened heat treatment effect in the region of the tooth base. Moreover, as a result of introducing the pre-toothing the surface is enlarged overall, so that a larger heat exchange surface is provided during the heating, quenching and tempering. Thanks to these two effects, there is a significant improvement in the strength in the region of the tooth base.

According to one advantageous embodiment, it is provided that the introducing of the pre-toothing, i.e. the pre-toothing, and/or the finish-toothing is done by means of a metal cutting process. For example, a milling method may be used for the pre-toothing or the finish-toothing.

Basically, the method according to the invention can be used for the fabrication of rings of any given tooth height. However, it has proven to be advantageous for the second tooth height to lie in the range of 50 mm to 125 mm. Preferably, the second tooth height lies in the range of 55 mm to 110 mm, especially preferably in the range of 65 mm to 100 mm. With a tooth height in one of these ranges, the method according to the invention produces a homogenized distribution of the strength values in the region from the tip to the base of the teeth.

Moreover, it is preferable for the first tooth height to be 50% to 95%, preferably 70% to 90%, especially preferably 75% to 85%, of the second tooth height. Such a choice of the tooth height produced by the pre-toothing ensures an increased heat treatment effect during the heat treatment following the pre-toothing in the region of the tooth base.

One advantageous embodiment of the method calls for heating the pre-toothed ring as a whole during the heating, quenching and tempering, so that—unlike in the case of induction hardening, for example—a heating of the entire material of the pre-toothed ring occurs. This affords the advantage that the heating effect is applied to the largest possible portion of the pre-toothed ring. Accordingly, the heating, quenching and tempering effect can also occur in the largest possible portion of the material. The heating of the pre-toothed ring can be done in a furnace, a continuous annealing plant or a batch annealing plant. Preferably, the pre-toothed ring is heated to a temperature which is greater than or equal to 850° C., preferably greater than or equal to 860° C., especially preferably greater than or equal to 870° C.

In this context, it has proven to be especially advantageous for the pre-toothed ring to be quenched as a whole after the heating, so that the pre-toothed ring is hardened as a whole. The quenching of the pre-toothed ring as a whole can be done, for example, by placing the pre-toothed ring in a quenching bath, especially one consisting of water, oil, or a polymer quenching agent.

Preferably, the pre-toothed ring is tempered after the quenching, especially at a temperature greater than or equal to 550° C., preferably greater than or equal to 570° C., especially greater than or equal to 580° C.

The toothing of the ring may be formed as an external toothing situated on the outer periphery of the ring or as an internal toothing situated on the inner periphery of the ring.

Preferably the toothing is formed as a solid toothing, extending over the entire outer periphery of the ring and/or over the entire inner periphery of the ring. Accordingly, the ring can be formed in the manner of a toothed wheel or a toothed ring.

Another preferred embodiment calls for the toothing to be formed as a partial toothing partially encircling the outer periphery of the ring and/or as a partial toothing partially encircling the inner periphery of the ring. A partial toothing on the outer periphery extends preferably over a first angle region of the outer periphery, while a second angle region of the outer periphery is provided with no toothing formed there. A partial toothing on the inner periphery extends preferably over a first angle region of the inner periphery, while a second angle region of the inner periphery is provided with no toothing formed there.

Moreover, it is advantageous for the ring to have a diameter in the range of 250 to 8000 mm, preferably in the range of 1800 mm to 7000 mm, especially preferably in the range of 2300 mm to 6000 mm. Rings with such diameters can be used as components of large gearings and large roller bearings for cranes, tunneling machines or wind power plants.

According to a preferred embodiment of the method, the ring with a toothing is hardened in certain areas after the finish-toothing, so that the strength of the ring is further increased in certain areas. The hardening in certain areas can be done for example by means of an induction hardening method and optional subsequent quenching by a spraying device. Especially preferably, the ring is hardened in a region not encompassing the toothing. For example, one side of the ring opposite the toothing can be hardened. Alternatively, it can be provided that the toothing of the ring is hardened at least in certain areas.

Further details, features and advantages of the invention will emerge from the drawings, as well as the following description of preferred embodiments with the aid of the drawings. The drawings illustrate only sample embodiments of the invention, not limiting the idea of the invention.

FIG. 1 represents schematically the flow chart of a method according to the invention for the production of a seamlessly rolled ring with a toothing. The toothing may be formed as an external toothing provided on the outer periphery of the ring or as an internal toothing which is formed on the inner periphery of the ring. It is possible to configure the toothing as a solid toothing extending around the entire outer periphery and/or inner periphery of the ring or as a partial toothing which extends over only a portion of the outer periphery and/or inner periphery. The seamlessly rolled rings have a diameter in the range of 250 to 8000 mm, preferably in the range of 1800 mm to 7000 mm, especially preferably in the range of 2300 mm to 6000 mm. Rings with such diameters can be used as components of large gearings and large roller bearings for cranes, tunneling machines or wind power plants.

First of all, in a sawing step 1, individual rod-shaped sections 101 are sawn from rod stock 100, especially a rod-shaped steel. These rod-shaped sections 101 are heated in a heating step 2 and formed into a disk-shaped form 102 in a following upsetting step 3 by upsetting, especially by means of free-form or swaging presses or hammers. After this comes a hole punching step 4, in which the disk-shaped forms 102 are punched in their middle in order to produce an inside annular hole. The forms provided with an inside annular hole constitute so-called pre-rings 103.

Starting with a pre-ring 103, the production of a ring blank 104 occurs by ring rolling 5. For this, ring rolling mills are used in the form of a radial-axial ring rolling mill. Such ring rolling mills typically have two rolling gaps in which the height of the ring blank 104 and the wall thickness of the ring blank 104 are reduced at the same time. The production of a ring blank 104 by ring rolling affords the advantage of forming a tangential course of the fibers typical for rolled rings, producing isotropic tangential mechanical properties over the entire ring periphery.

As a departure from the representation in FIG. 1, the ring blank 104 can be additionally normalized. The normalization can be done at a temperature greater than or equal to 850° C., preferably greater than or equal to 860° C., especially preferably greater than or equal to 870° C. Moreover, the ring blank 104 may be rough-turned in a further optional step, in order to obtain a rectangular ring cross section.

According to the invention, the ring blank 104 is subjected to a pre-toothing step 6. In this process, a pre-toothing is introduced into the seamlessly rolled ring blank 104, wherein the pre-toothing has teeth with a first tooth height which is reduced in relation to the nominal tooth height of the final toothing. This pre-toothing is done by means of a metal machining process, such as by means of milling, especially by means of hobbing. Thanks to the pre-toothing 6, a pre-toothed ring 105 is formed from the ring blank.

Immediately after the pre-toothing 6, the pre-toothed ring 105 is heat treated by heating, quenching and tempering as a whole. In the course of the heating, quenching and tempering 7 the pre-toothed ring 105 as a whole is at first heated to a temperature in the range of greater than or equal to 850° C., preferably greater than or equal to 860° C., especially preferably greater than or equal to 870° C. The heating 7.1 is done for example by means of a furnace, a continuous annealing plant or a batch annealing plant. Directly after the heating 7.1 the pre-toothed ring is quenched as a whole, for example by placing the pre-toothed ring as a whole in a quenching bath, especially one consisting of water, oil, or a polymer quenching agent. In this process, the pre-toothed ring as a whole is hardened. After the quenching 7.2 comes a tempering step 7.3, in which the pre-toothed ring is tempered after the quenching 7.2 at a temperature greater than or equal to 550° C., preferably greater than or equal to 570° C., especially greater than or equal to 580° C. The tempering 7.3 completes the heating, quenching and tempering 7 of the pre-toothed ring 105.

The heat-treated and pre-toothed ring 106 is now finish-toothed by means of a metal machining process. In this process, the tooth height of the toothing is increased so that the second tooth height produced in the finish-toothing 8 is greater than the first tooth height obtained by the pre-toothing. Optionally, the inner periphery of the ring can be further increased by a lathe turning process.

The finish-toothed ring 107 is then hardened in certain areas, so that the strength of the ring is further increased in certain areas. The hardening 9 in certain areas is done by means of an induction hardening method followed by quenching with a spraying device. Preferably those regions of the ring 107 are hardened that are free of toothing. In the case of an external toothing, for example, the inner contour of the ring 107 may be hardened. In the case of a ring 107 with an internal toothing, the hardening in certain areas may occur on the outer periphery of the ring 107.

In the above described method for producing a ring with a toothing 108 the following steps are carried out:

(a) ring rolling 5 of a pre-ring 103 to form a ring blank 104, (b) introducing a pre-toothing into the ring blank 104 to form a pre-toothed ring 105, wherein the pre-toothing has teeth with a first tooth height, (c) heating, quenching and tempering 7 of the pre-toothed ring 105 to form a heat-treated pre-toothed ring 106, and (d) finish-toothing 8 of the heat-treated pre-toothed ring 106 to form a ring with a toothing, wherein the toothing has teeth with a second tooth height, which is greater than the first tooth height. In this way, one can achieve improved strength in the region of the tooth base.

LIST OF REFERENCE NUMBERS

1 Sawing
2 Heating
3 Upsetting
4 Hole punching
5 Ring rolling
6 Pre-toothing
7 Heating, quenching and tempering
7.1 Heating
7.2 Quenching
7.3 Tempering
8 Finish-toothing
9 Hardening
100 Rod-shaped stock
101 Rod-shaped section
102 Disk-shaped form
103 Pre-ring
104 Ring blank
105 Pre-toothed ring
106 Heat-treated pre-toothed ring
107 Finish-toothed ring
108 Hardened ring

What is claimed is:

1. A method for producing a ring with a toothing, the method comprising:
    ring rolling a pre-ring to form a ring blank;
    introducing a pre-toothing into the ring blank to form a pre-toothed ring, wherein the pre-toothing includes teeth with a first tooth height;
    heating, quenching, and tempering the pre-toothed ring to form a heat-treated pre-toothed ring; and
    finish-toothing the heat-treated pre-toothed ring to form a ring with a toothing, wherein the toothing includes teeth with a second tooth height that is greater than the first tooth height.

2. The method of claim 1 wherein at least one of the introducing of the pre-toothing or the finish-toothing of the heat-treated pre-toothed ring is performed by way of a metal machining process.

3. The method of claim 1 wherein the second tooth height is in a range of 50 mm to 125 mm.

4. The method of claim 1 wherein the second tooth height is in a range of 65 mm to 100 mm.

5. The method of claim 1 wherein the first tooth height is 50% to 95% of the second tooth height.

6. The method of claim 1 wherein the first tooth height is 75% to 85% of the second tooth height.

7. The method of claim 1 wherein the heating, quenching, and tempering comprises heating the pre-toothed ring as a whole to a temperature greater than 870° C.

8. The method of claim 1 wherein the heating, quenching, and tempering comprises heating the pre-toothed ring as a whole.

9. The method of claim 8 wherein the pre-toothed ring is quenched as a whole after the heating by placing the pre-toothed ring in a quenching bath.

10. The method of claim 8 wherein the pre-toothed ring is quenched as a whole after the heating.

11. The method of claim 10 wherein the pre-toothed ring is tempered after the quenching.

12. The method of claim 10 wherein after the quenching the pre-toothed ring is tempered at a temperature greater than 550° C.

13. The method of claim 10 wherein after the quenching the pre-toothed ring is tempered at a temperature greater than 580° C.

14. The method of claim 1 wherein the toothing is formed as an external toothing disposed on an outer periphery of the ring or an internal toothing disposed on an inner periphery of the ring.

15. The method of claim 1 wherein the toothing is a solid toothing that extends over at least one of an entire outer periphery of the ring or an entire inner periphery of the ring.

16. The method of claim 1 wherein the toothing is formed as at least one of a partial toothing that partially encircles an outer periphery of the ring or a partial toothing that partially encircles an inner periphery of the ring.

17. The method of claim 1 wherein the ring has a diameter in a range of 250 mm to 8000 mm.

18. The method of claim 1 wherein the ring has a diameter in a range of 2300 mm to 6000 mm.

19. The method of claim 1 comprising hardening the ring with the toothing in areas after the finish-toothing of the heat-treated pre-toothed ring.

20. The method of claim 1 comprising induction hardening the ring with the toothing in areas after the finish-toothing of the heat-treated pre-toothed ring.

* * * * *